United States Patent
Shrotri et al.

(10) Patent No.: US 11,743,124 B2
(45) Date of Patent: *Aug. 29, 2023

(54) DEPLOYING DATA-LOSS-PREVENTION POLICIES TO USER DEVICES

(71) Applicant: VMware, Inc., Palo Alto, CA (US)

(72) Inventors: Aditya Shrotri, Atlanta, GA (US); Sagar Date, Atlanta, GA (US)

(73) Assignee: VMware, Inc., Palo Alto, CA (US)

(*) Notice: Subject to any disclaimer, the term of this patent is extended or adjusted under 35 U.S.C. 154(b) by 140 days.

This patent is subject to a terminal disclaimer.

(21) Appl. No.: 17/236,006

(22) Filed: Apr. 21, 2021

(65) Prior Publication Data

US 2021/0243085 A1 Aug. 5, 2021

Related U.S. Application Data

(63) Continuation of application No. 15/997,322, filed on Jun. 4, 2018, now Pat. No. 11,012,309.

(51) Int. Cl.
*H04L 29/06* (2006.01)
*H04L 41/0893* (2022.01)
(Continued)

(52) U.S. Cl.
CPC ......... *H04L 41/0893* (2013.01); *G06F 21/57* (2013.01); *G06F 21/60* (2013.01);
(Continued)

(58) Field of Classification Search
CPC ..... H04L 41/0893; H04L 67/34; H04L 63/20; H04W 4/50; G06F 21/57; G06F 21/60
See application file for complete search history.

(56) References Cited

U.S. PATENT DOCUMENTS 8,544,060 B1* 9/2013 Khetawat ................ H04L 63/20
726/1
8,950,005 B1 2/2015 Torney
(Continued)

FOREIGN PATENT DOCUMENTS

CN 104471900 3/2015
CN 104641377 5/2015
(Continued)

OTHER PUBLICATIONS

Supplementary European Search Report dated Jan. 27, 2022, Application No. 19814748.0 (PCT/US2019/034464).
(Continued)

*Primary Examiner* — Evans Desrosiers
(74) *Attorney, Agent, or Firm* — Clayton, McKay & Bailey, PC

(57) ABSTRACT

Examples described herein include systems and methods for deploying Data Loss Prevention (DLP) policies to user devices. An example method can include receiving a configuration specifying at least one DLP policy applicable to an application, along with an indication of an assignment group specifying users, or user devices, to which the DLP policy should apply. Information regarding the DLP policy and assignment group can be provided to an identity service and then synchronized with a second server that manages the application. The method can further include provisioning the application to a user device and instructing the user device to retrieve the DLP policy from the second server and implement it when executing the provisioned application.

20 Claims, 6 Drawing Sheets

(51) Int. Cl.
*G06F 21/60* (2013.01)
*H04W 4/50* (2018.01)
*G06F 21/57* (2013.01)
*H04L 67/00* (2022.01)
*H04L 9/40* (2022.01)

(52) U.S. Cl.
CPC ............... *H04L 67/34* (2013.01); *H04W 4/50* (2018.02); *H04L 63/20* (2013.01)

(56) References Cited

U.S. PATENT DOCUMENTS

| | | | |
|---|---|---|---|
| 9,349,016 | B1 | 5/2016 | Michel |
| 2012/0151551 | A1 | 6/2012 | Readshaw |
| 2014/0026182 | A1 | 1/2014 | Pearl |
| 2014/0047503 | A1 | 2/2014 | Marshall |
| 2016/0226918 | A1* | 8/2016 | Readshaw ............. H04L 63/104 |
| 2016/0315930 | A1 | 10/2016 | Kim |
| 2017/0264640 | A1 | 9/2017 | Narayanaswamy |

FOREIGN PATENT DOCUMENTS

| | | |
|---|---|---|
| CN | 107409126 | 11/2017 |
| CN | 107624238 | 1/2018 |
| CN | 107111702 | 12/2020 |
| WO | WO2017058842 A1 | 4/2017 |

OTHER PUBLICATIONS

"Search Report dated Sep. 25, 2019 for International Application No. PCT/US2019/034464."

Office Action dated Sep. 19, 2022 for CN201980048648.7.

* cited by examiner

DEPLOYING DATA-LOSS-PREVENTION POLICIES TO USER DEVICES

This application is a continuation of U.S. patent application Ser. No. 15/997,322, filed Jun. 4, 2018, and titled "DEPLOYING DATA-LOSS-PREVENTION POLICIES TO USER DEVICES." This application claims benefit of priority to U.S. patent application Ser. No. 15/997,322 and incorporates it by reference herein in its entirety for all purposes.

BACKGROUND

Enterprises can generate a large volume of sensitive data that, in many cases, needs to be restricted in some way. This can include confidential business information that should not leave the enterprise as well as data that should only be accessible to particular individuals within the enterprise. For example, a document containing confidential legal information can be made available to employees within the legal department but not to employees in the accounting department.

Many currently available applications include data-loss-prevention ("DLP") functionality. DLP policies can be implemented to restrict an application in a manner that prevents the unwanted loss of data by identifying certain types of sensitive information and preventing it from being shared in an unauthorized manner. The policies can be specific to one application or a group of applications. They can establish conditions that trigger a rule, along with resulting actions to take when those conditions are met. As an example, the author of a text-based document can implement a DLP policy for the document specifying that if the document is transmitted to another user, that user should not be able to copy and paste content from the document or print the document.

DLP policies for an application are typically established by accessing a user interface provided by the application's provider. This process can be cumbersome for enterprise administrators, causing them to visit various web locations to set or change DLP policies for various applications. The process also lacks efficiency when dealing with "user groups," or subsets of an enterprise's employees, that should have differing DLP policies amongst them. A third-party application provider is typically unaware of an enterprise's user groups and does not provide functionality allowing an enterprise administrator to conveniently define DLP policies for particular groups.

As a result, a need exists for systems and methods for automatically deploying DLP policies to user devices based on assigned user groups.

SUMMARY

Examples described herein include systems and methods for deploying DLP policies to user devices. An example method includes receiving, at a management server, a configuration that specifies at least one DLP policy applicable to at least one application. The configuration can be provided by an enterprise administrator using a console in communication with the management server, for example. The example method can also include receiving an indication of an assignment group that specifies multiple users or user devices to which the DLP policy should be applied. The relevant user devices can be enrolled with, and managed by, the management server.

The management server can send an instruction to a third-party server that causes the third-party server to implement the DLP policy, or policies, specified by the administrator. Throughout this disclosure, the term "third-party server" is used in a strictly exemplary manner and is not intended to limit any portion of this disclosure to an actual "third party" of some sort. In other words, the third-party server can be owned, operated, and managed by the same company or entity creating the DLP policy. The term "third party" is therefore explicitly non-limiting. In some examples, the third-party server is associated with, a part of, or the same as the management server.

The instruction can be specific to the assignment group specified previously. For example, the instruction can instruct the third-party server to implement one DLP policy for a first group of users (or user devices) and a second DLP policy for a second group of users (or user devices), as desired.

The third-party application can implement the DLP policy for the group based on information regarding the assignment group. That information can be made available by an identity service that provides user identification and authentication services. The identity service can be accessible by both the management server and third-party server. The third-party server can therefore access the identity service and retrieve information regarding the assignment group, such as an identification of the assignment group and the users or user devices within the group.

The application can be managed by the third-party server. For example, the application can implement policies and carry out instructions as specified by the third-party server. The third-party server can manage a group, or suite, of related applications in some examples. In situations where the third-party server manages multiple applications, the DLP policies can be configured to apply across some or all of those applications.

The example method can also include provisioning the relevant application to a user device. The management server can provision the application to the user device for installation. Provisioning can also include instructing the user device to retrieve the DLP policy from the third-party server and implement the policy when executing the relevant application. In some examples, the user device can retrieve and implement the DLP policy without requiring user input.

The examples summarized above can be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for deploying DLP policies to user devices. An example method can include receiving a configuration specifying at least one DLP policy applicable to an application, along with an indication of an assignment group specifying users, or user devices, to which the DLP policy should apply. Information regarding the DLP policy and assignment group can be provided to an identity service and then synchronized with a third-party server that manages the application. The method can further include provisioning the application to a user device and instructing the user device to retrieve the DLP policy from the third-party server and implement it when executing the provisioned application.

As explained above, the term "third-party server" is used in a strictly exemplary manner and is not intended to limit any portion of this disclosure to an actual "third party" of some sort. In other words, the third-party server can be owned, operated, and managed by the same company or entity creating the DLP policy. The term "third party" is therefore explicitly non-limiting. In some examples, the third-party server is associated with, a part of, or the same as the management server.

Figure 1:
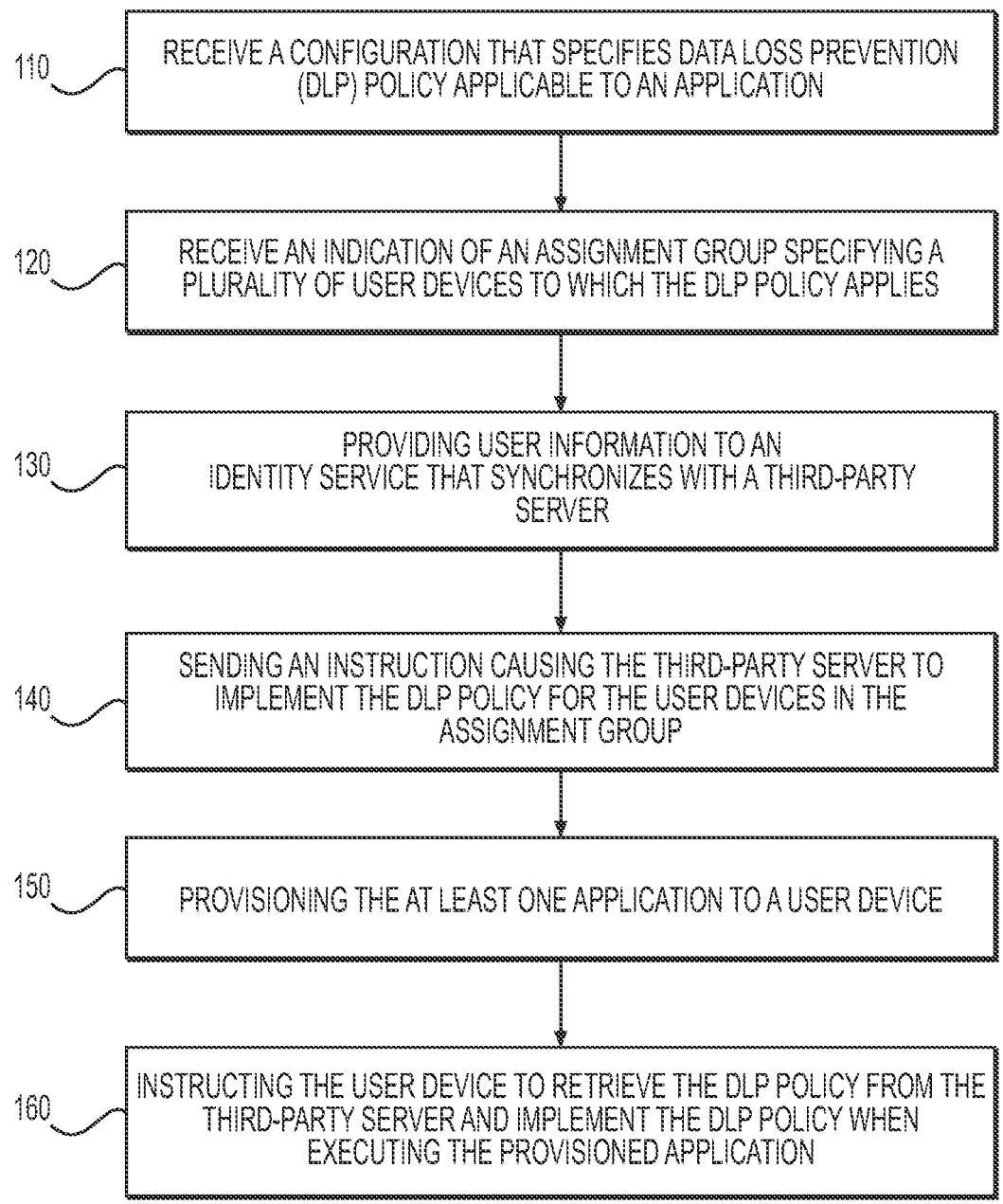
FIG. 1 is a flowchart of an example method for deploying DLP policies to a user device.
Figure 2:
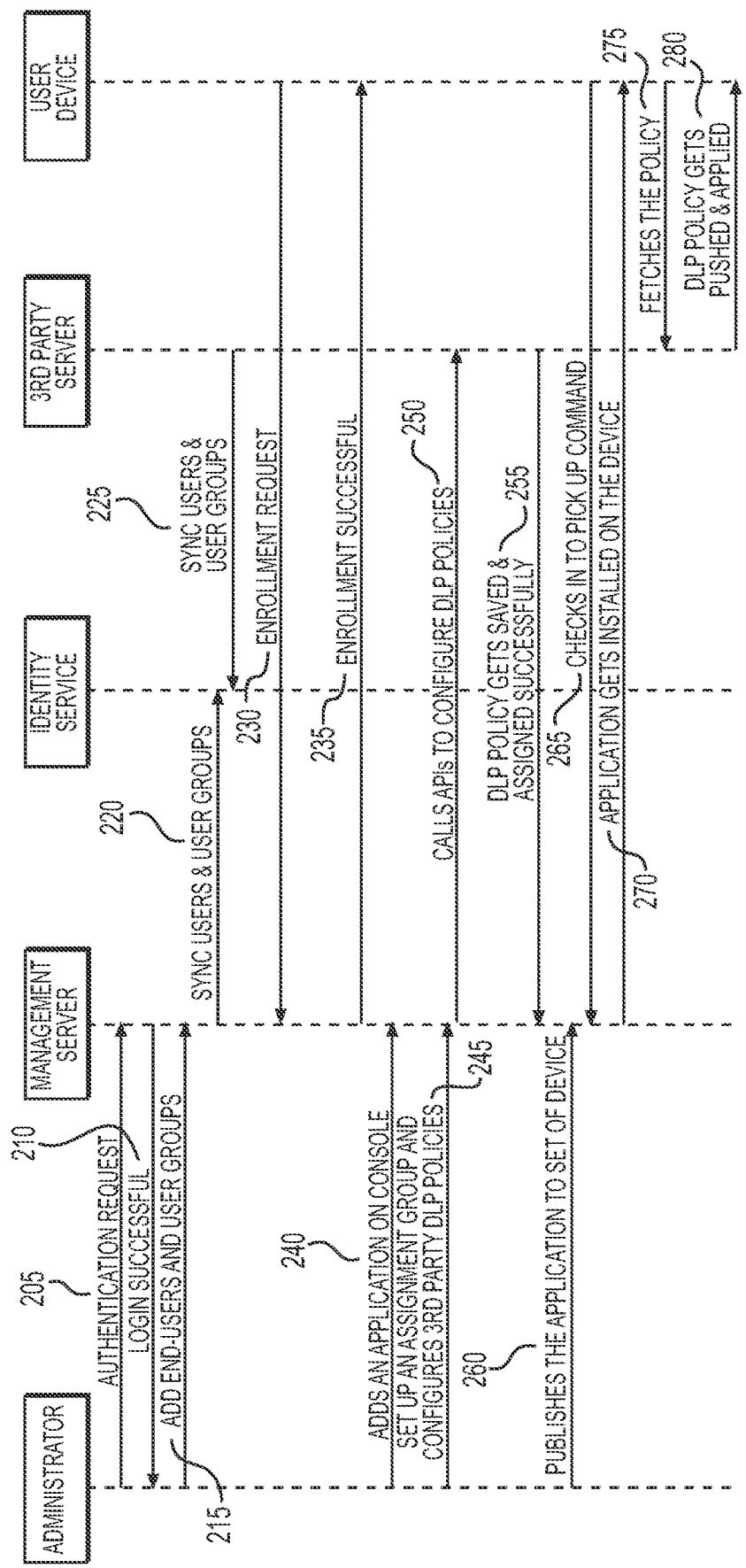
FIG. 2 is a sequence diagram of an example method for deploying DLP policies to a user device.
Figure 3:
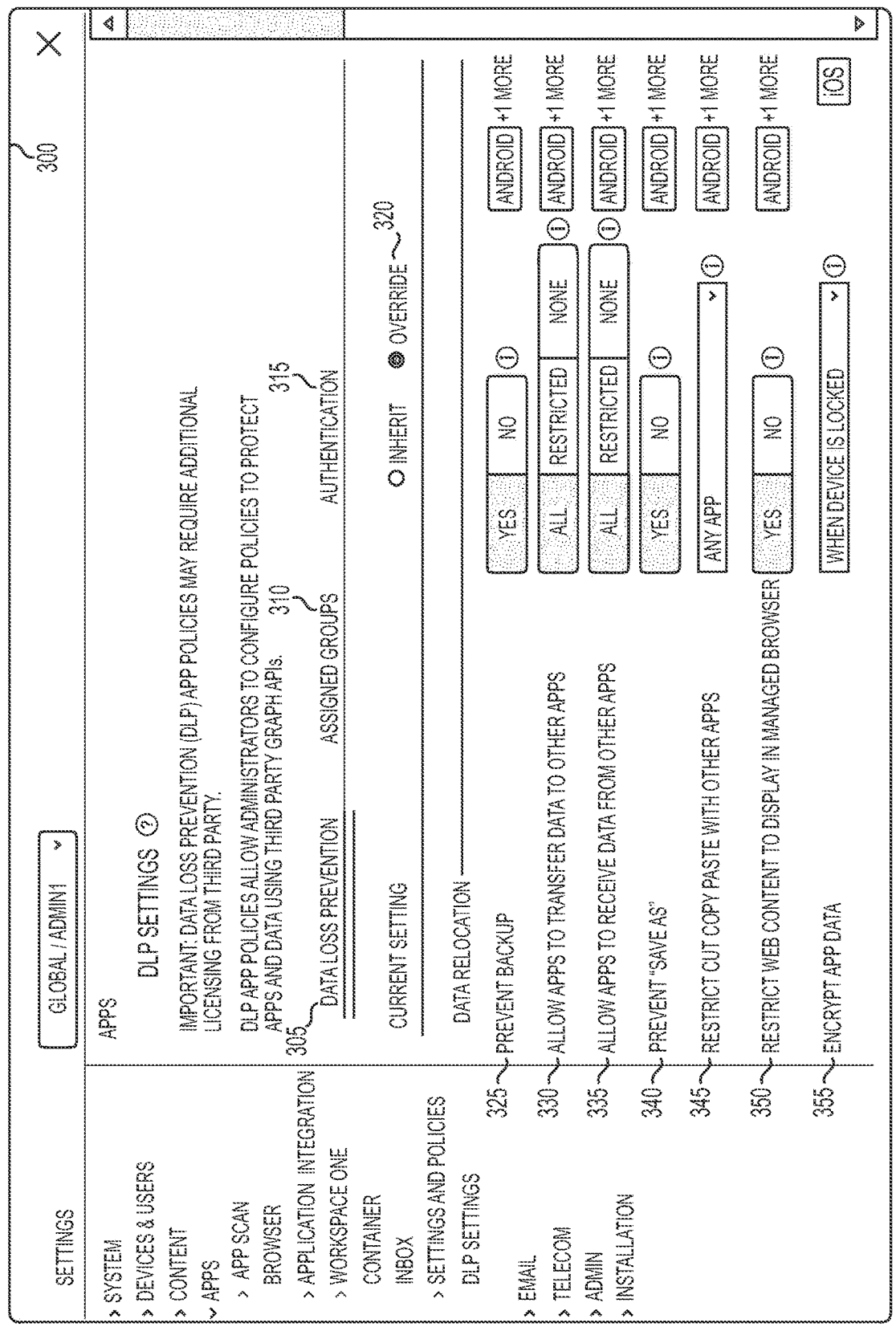
FIG. 3 is an illustration of an example user interface for configuring and deploying DLP policies to a user device.
Figure 4:
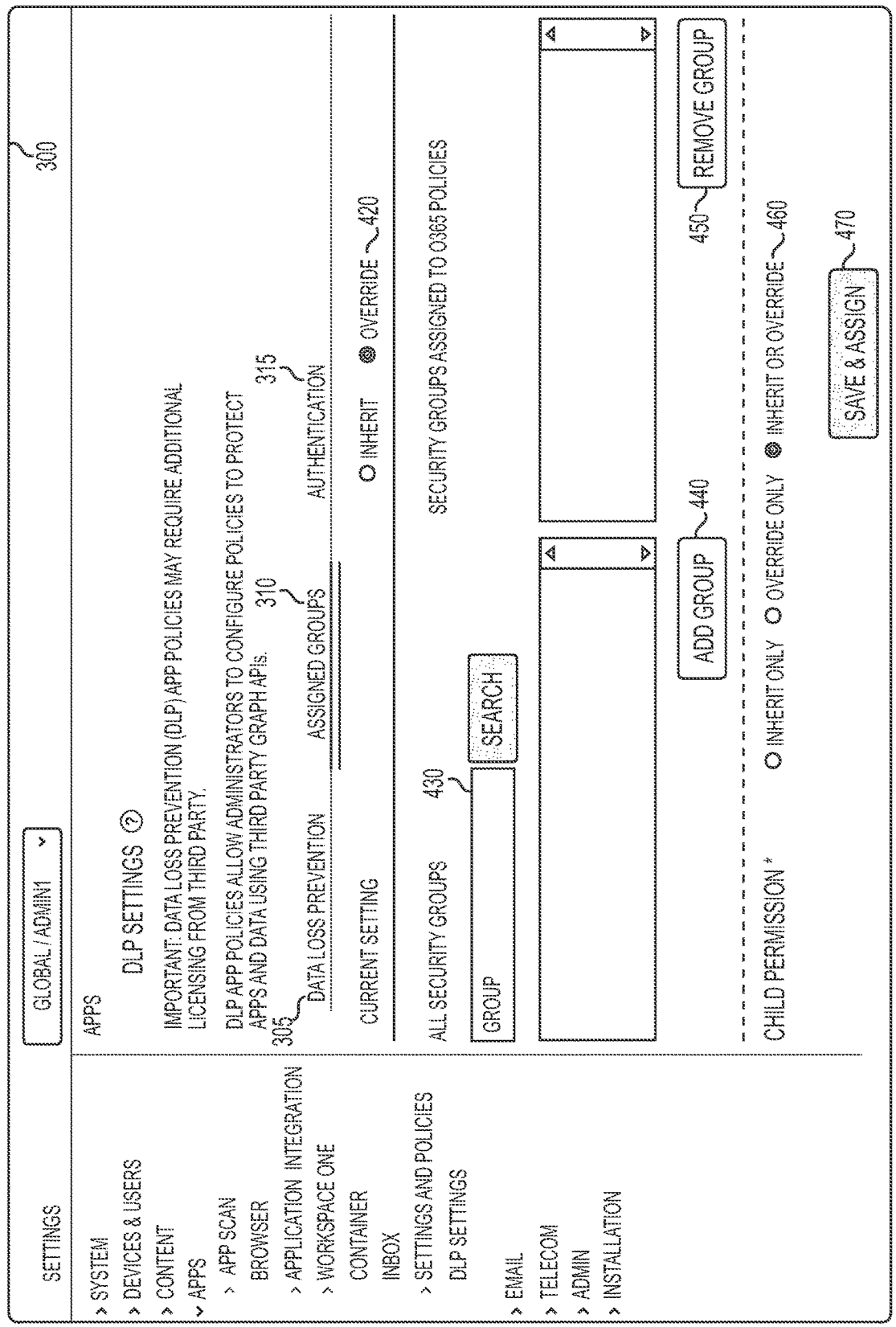
FIG. 4 is an illustration of an example user interface for configuring and deploying DLP policies to a user device.
Figure 5:
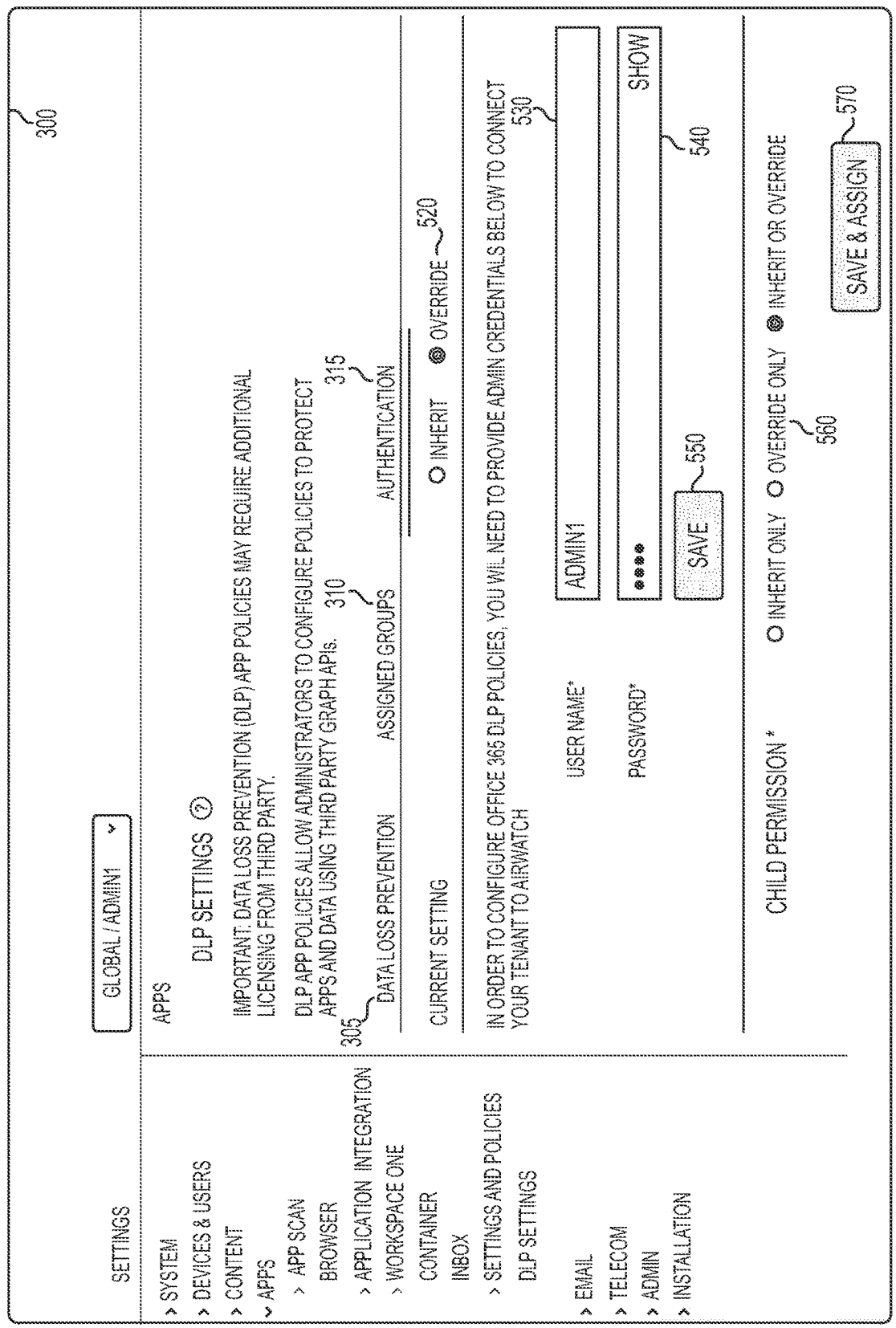
FIG. 5 is an illustration of an example user interface for configuring and deploying DLP policies to a user device.
Figure 6:
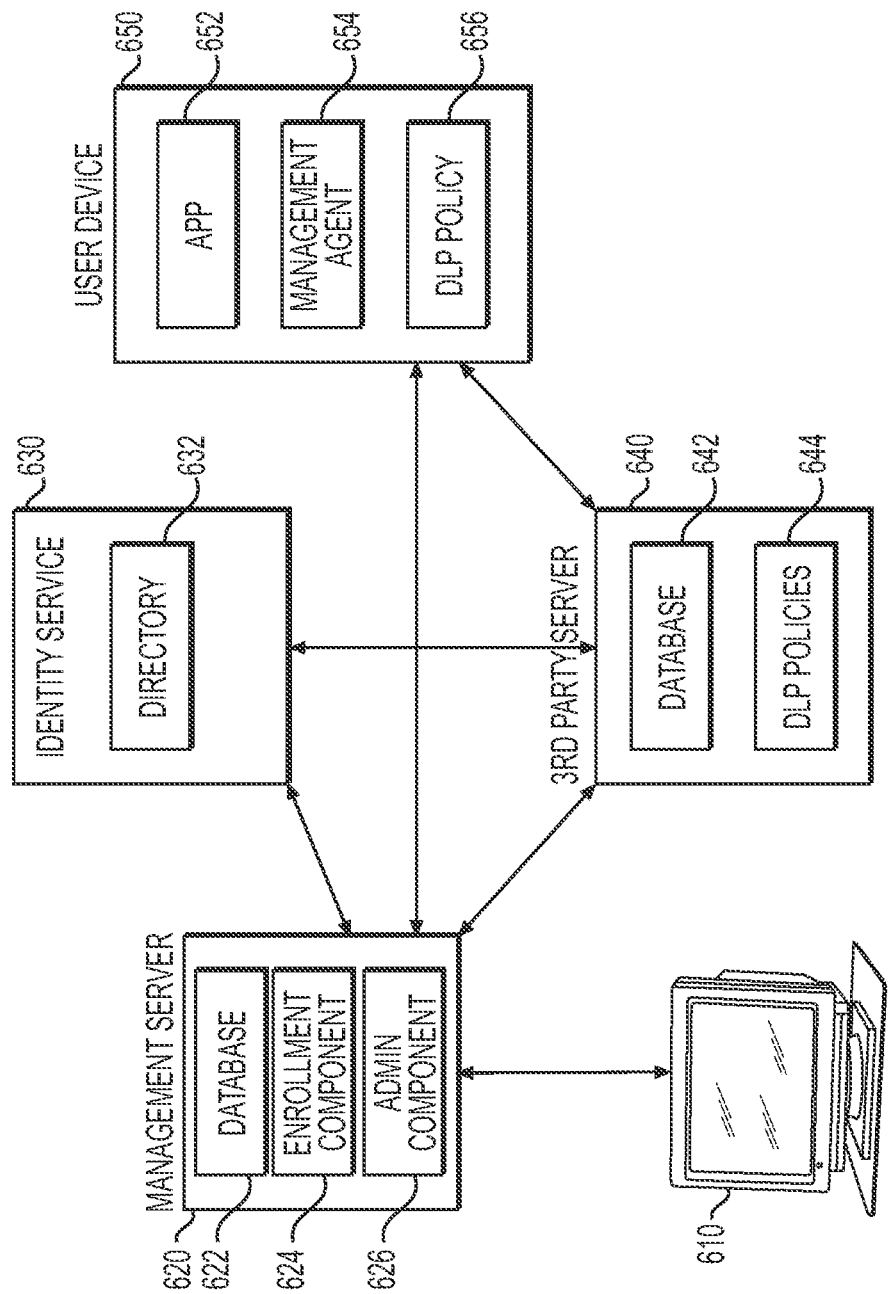
FIG. 6 is an illustration of an example system configured to carry out exemplary methods provided herein.

FIG. 1 provides a flowchart of an example method for deploying DLP policies to a user device. FIG. 2 provides a sequence diagram of a more detail example method for deploying DLP policies, including interactions with an identity service. FIGS. 3-5 provide illustrations of an example user interface that can be used by an enterprise administrator for configuring and deploying DLP policies to a user device. FIG. 6 provides an illustration of an example system for carrying out the disclosed methods.

Turning to the example method of FIG. 1, stage 110 can include receiving a configuration that specifies a DLP policy for an application. As used herein, a "configuration" can be an instruction, indication, message, or other communication conveying one or more configuration details. The configuration details can include one or more DLP policies, as well as other information. For example, a configuration can include an identification of a user device, an identification of a DLP policy, and an instruction to implement the DLP policy for that user device when executing the relevant application.

The configuration can be generated by an enterprise administrator accessing a console or portal in communication with a management server. The console or portal can include options that the administrator uses to create the configuration. The management server can be a single server or a network of servers and can utilize one or more processors and memory stores. It can also store information regarding users and user devices enrolled into the enterprise system, user profiles, compliance rules, and authorizations for particular users, devices, and applications. This information can be stored at the management server or at a database accessible to the management server. An enterprise administrator with adequate credentials can access information stored in, or accessible to, the management server. The administrator can access that information through a web portal or console that is in communication with the management server.

The configuration can specify a DLP policy applicable to one more applications. A DLP policy can include one or more DLP rules the specify rules or restrictions to be implemented in an application. An example DLP rule can prevent backup of a file. Another example rule can restrict the transfer of data between particular applications. In another example, a DLP rule can block "save as" functionality for an application. Another example rule can restrict cutting, copying, and pasting between particular applications. Yet another example can restrict web content to only be displayed in a managed (rather than unmanaged) web browser. In another example, a DLP rule can enforce encryption requirements for an application at particular times, such as when a device is locked.

A DLP policy can apply to more than one application. For example, a DLP policy can apply to multiple third-party applications managed by the same third-party company. A DLP policy can also apply to multiple applications managed by multiple respective third-party companies. An example of such a third-party is MICROSOFT, which provides the OFFICE 365 suite of applications that includes WORD, EXCEL, POWERPOINT, ONENOTE, OUTLOOK, PUBLISHER, and ACCESS. A DLP policy therefore can be specific to an application or a group of applications managed by a third party. In some examples, the availability of DLP policies is determined by the third-party application provider and configurable via a third-party web portal. However, configuration options via a third-party web portal typically lack functionality for tying the DLP policies to specific assignment groups established at the enterprise management server.

Stage 120 can include receiving an indication of an assignment group specifying one or more user devices to which the DLP policy applies. An assignment group can be any group identifying one or more users or user devices. The assignment group can be a group already stored on the management server, such as a group that includes all enrolled users within a department. For example, a "legal" group can include all enrolled users within the enterprise's legal department, while an "accounting" group can include enrolled all users within the enterprise's accounting department. In another example, an "android" group can include all enrolled user devices running an ANDROID operating system, while an "iOS" group can include all enrolled user devices running an iOS operating system.

In addition to the examples identified above, the assignment groups can also be granular in nature. For example, an assignment group can identify users located on a specific floor of an office building or a specific geographic location. In another example, an assignment group can identify user devices running a particular version of an operating system or a particular application. Assignment groups can also include manually selected users or user devices.

Assignment groups can be directed to users, user devices, or both. For example, an assignment group can apply to all enrolled user devices belonging to all users within an enterprise department. Alternatively, it can apply to certain types of enrolled user devices belonging to users within the department. The assignment group can also target user devices, without considering the individual users. The term "assignment group," as used herein, is therefore intended to apply broadly to users, user devices, or a combination of both, even if described in an example that only mentions users or user devices.

Assignment groups can be selected at a console associated with the management server. The indication of the assignment group can be received at the management server concurrently with the configuration from stage 110, in an example. For example, the DLP policy can be tied to an assignment group and that information can be transmitted to the management server when an administrator saves their selections at the console.

Stage 130 can include send providing user information to an identity service that synchronizes with a third-party server. The management server can send the user information before, after, or concurrently with stages 110 and 120. The identity service can grant permission to a third-party server to allow the third-party server to synchronize with the identity service. As a result, the third-party server can maintain an up-to-date directory of users and user groups for the relevant enterprise.

In some examples, the identity service can provide identity verification services, such as single-sign-on ("SSO") or other authentication-related services. However, in some examples the identity service can simply provide a directory. The directory can include a listing of enrolled users and any relevant user groups. The directory can be continuously updated by the management server, either periodically or whenever a change is made at the management server. Similarly, the third-party server can synchronize with the directory periodically or when it receives an indication that a change has taken place at the directory. In one example, the identity service is an ACTIVE DIRECTORY service.

Stage 140 can include sending an instruction causing the third-party server to implement the DLP policy for the user devices in the assignment group. The instruction can originate from the management server in one example. The instruction can include one or more application programming interface ("API") calls made available by the third-party server. The instruction can also include authentication credentials that authenticate the instruction to the third-party service, indicating that it originated from the management server. The authentication credentials can include passwords, tokens, signatures, and key pairings. The instruction can be encrypted using a public-private key pairing or other cryptographic method.

The third-party server can use the identity service to identify users or user devices implicated by an assignment group received at stage 120. For example, the assignment group can specify that DLP policies apply to all users within the accounting group. The third-party server can receive the indication of the accounting assignment group and reference the identity service to determine the particular user devices that belong to the accounting group.

Stage 150 can include provisioning to a user device the application (or applications) to which the DLP policies apply. Provisioning can include causing the user device to download the relevant application, either from the management server or from an online application store such as GOOGLE PLAY or APP STORE. Provisioning can include, for example, publishing an application to a device by making the application available for download and pushing a notification to the device that instructs the device to check in at the management server and download the application. Having received the notification, the device can access the management server and download the application.

In some examples, the management server communicates with the user device through a management agent executing on the user device. The management agent can be a portion of an operating system for the device, or it can operate in the application layer of the device. For example, the management agent can be a dedicated application or other software that can monitor and manage data, software components, and hardware components associated with the user device. The management agent can monitor and control functionality and other managed applications on the user device. The management agent installed on the user device can include functionality for utilizing components specific to the user device, such as a GPS sensor, accelerometer, or gyroscope. The management agent can have privileged access to communicate with the management server.

Stage 160 of the example method can include instructing the user device to retrieve the DLP policy from the third-party server and implement it accordingly. The instruction can be provided along with, or as a part of, the instruction sent to the user device at stage 140. In response to the instruction, the user device can request the DLP policy from the third-party server. The third-party server can push the DLP policy down to the user device for implementation. The user device can then implement the DLP policy when executing the provisioned application or any other application relevant to the DLP policy.

The DLP policy can be applied to applications downloaded after fetching the DLP policy, in some situations. As mentioned earlier, a DLP policy can apply to multiple applications offered or managed by a third-party. A user can download a first application and an accompanying DLP policy that applies to multiple applications. After installing the first application and applying the relevant DLP policies, the user device can then download a second application that also implicates the DLP policy. In this example, when the user device executes the second application, the DLP policy retrieved in conjunction with the first application can be applied to the second application. There are no limits on the number of applications to which a DLP policy can apply.

FIG. 2 is a sequence diagram of an example method for deploying DLP policies to a user device. At stage 205, an administrator can request authentication at a management server. The request can include authentication credentials for the administrator, such as a password, token, certificate, signature, or key pairing. The authentication credentials can confirm that the administrator is authorized to access the management server, such as by using a console in communication with the management server. Example console interfaces are provided in FIGS. 3-5. At stage 210, the management server can authenticate the administrator and allow access.

At stage 215, the administrator can add end users and user groups to the system through the console. Adding end users can include, for example, entering new enterprise employees to the system and providing any accompanying information for those users, such as their department, job title, email address, authorizations, and any assigned devices. User groups can also be created or modified at stage 215. A user group can include any grouping of users. A user group can include data representing a group of user devices managed by the management server. A user group can correspond to a structure or hierarchy of a business or enterprise. For example, an enterprise can have various groups such as an engineering team, an accounting team, and a marketing team. Each of these teams can correspond to a user group stored on the management server.

In addition to corresponding to a business team, a user group can correspond to user devices positioned in a particular geographic location. For example, a business can have different business locations, such as a public waiting room, private conference room, a laboratory, office space, and a parking garage. In this example, separate groups can be established for each of the public waiting room, private conference room, laboratory, office space, and parking garage. User devices positioned in one of these locations can be included in the respective user group.

The end users and user groups created or edited at stage 215 can be stored by the management server, either at the server itself or at a database or cloud storage location available to the management server. At stage 220, the management server can update and synchronize with an identity service. The identity service can store a directory of users and user groups associated with the management server. Stage 220 can be performed automatically by the management server whenever it recognizes a change in any of its stored users or user groups. Stage 220 can also be performed periodically, based on an amount of time lapsed from the previous synchronization.

In addition to being accessible by the management server, the identity service can also be accessible by a third-party server. In this example, the third-party server is managed or operated by a third party that provides an application to be provisioned to a user device in later steps. The third-party server can synchronize with the identity service at stage 225. In some examples, the management server alerts the third-party server that a change has been made at the identity service. In other examples, the identity service alerts the third-party server when it detects a change in the directory. In either case, the third-party server can synchronize with the identity service at stage 225.

At stage 230, an unenrolled user device can send an enrollment request to the management server. This stage can be performed at an earlier stage of the method, or in examples where the user device is already enrolled, this stage of the method can be skipped. If the user device is not enrolled, it can begin the enrollment process at stage 230. The management server can include an enrollment component and an administrator component, both of which can be used for the process of enrolling the user device. For example, the user device can communicate with the enrollment component during the initial stages of enrollment. In some examples, the enrollment component can provide a token to the user device indicating that the user device has been authenticated and is permitted to communicate and enroll with the management server. The management server or enrollment component can provide the user device with information regarding how to access and communicate with the administrator component to continue the enrollment process.

In some examples, the administrator component can request a token from the user device, indicating that the user device has been authenticated and is permitted to continue the enrollment process with the administrator component. Upon receiving the token, the administrator component can continue the enrollment process. The administrator component can also provide a console for an administrator to configure and monitor the status of the user device and the enrollment process. In some examples, the administrator component can be dedicated to a single enterprise or group of enterprises, while the enrollment component can be shared across multiple different enterprises.

As part of the enrollment process, a management agent can be provisioned to the user device. As explained above, the management agent can monitor and control functionality and other managed applications on the user device. The management agent installed on the user device can include functionality for utilizing components specific to the user device, such as a GPS sensor, accelerometer, or gyroscope. The management agent can have privileged access to communicate with the management server.

Having requested enrollment at 230, the user device can receive a notification of successful enrollment at stage 235.

At stage 240, the administrator can add an application on the console. Adding an application can include, for example, selecting an application from a list of available applications provided at the console. The applications can be selected from an online application store, such as GOOGLE PLAY or the APP STORE. Adding an application at the console can instruct the management server that the application can be made available to selected user devices. In some examples, the application can be made available to some users but not others. Adding an application at stage 240 can also include adding a suite of related applications, such as multiple applications from the MICROSOFT OFFICE 365 suite of applications.

At stage 245, the administrator can set up an assignment group and configure third-party DLP policies for that assignment group. An assignment group can be any group of users, or user devices, to which a particular DLP policy should apply. In some examples, the assignment group is created manually by selecting individual users or user devices to be in the group. In other examples, the assignment group is created by selecting one or more user groups created at stage 215. In yet other examples, the assignment group is a combination of preexisting user groups and manual selection by the administrator.

In a first example, an administrator can create a first assignment group by selecting all enterprise users and exempting users from an executive group and a legal group. DLP policies applied to the first assignment group would therefore apply to all users except those in the executive and legal groups. In a second example, the administrator can create a second assignment group by selecting all users within an accounting group but exempting users from a primary office location. In that example, DLP policies applied to the second assignment group would only apply to users within the accounting group located at office locations other than the primary office location. In a third example, an administrator can create a third assignment group by selecting users within the administrative staff group but exempting particular individuals. In that example, only the non-exempted users of the administrative staff would be subject to DLP policies tied to the third assignment group.

DLP policies can also be established at stage 245. A DLP policy can include one or more DLP rules the specify rules or restrictions to be implemented in an application. An example DLP rule can prevent backup of a file. Another example rule can restrict the transfer of data between particular applications. In another example, a DLP rule can block "save as" functionality for an application. Another example rule can restrict cutting, copying, and pasting between particular applications. Yet another example can restrict web content to only be displayed in a managed (rather than unmanaged) web browser. In another example, a DLP rule can enforce encryption requirements for an application at particular times, such as when a device is locked.

A DLP policy can apply to more than one application. For example, a DLP policy can apply to multiple third-party applications managed by the same third-party company. An example of such a third-party is MICROSOFT, which provides the OFFICE 365 suite of applications that includes WORD, EXCEL, POWERPOINT, ONENOTE, OUT- LOOK, PUBLISHER, and ACCESS. A DLP policy therefore can be specific to a particular application or a group of applications managed by a third party. In some examples, the availability of DLP policies is determined by the third-party application provider and configurable via a third-party web portal.

At stage 250, the management server can make one or more API call to the third-party server to configure the DLP policies for corresponding assignment groups. The third-party operating the third-party server can publish API calls allowing the management server to communicate details of a DLP policy as well as identify one or more assignment groups for each of the DLP policies. For example, the management server can use API calls to identify the first, second, and third assignment groups described above with respect to stage 245. For each group, the API calls can identify one or more DLP policies.

In one example, API calls from the management server identify the first assignment group and a first DLP policy that corresponds to the first assignment group. The first DLP policy can restrict cutting, copying, and pasting between applications and can enforce encryption requirements for an application when a device is locked. In another example, the API calls from the management server can identify the second assignment group and a second DLP policy that corresponds to the second assignment group. The second DLP policy can include the same restrictions as the first DLP policy but additionally include preventing "save as" functionality for an application. The API calls made at stage 250 can identify multiple assignment groups and their corresponding DLP policies.

In some examples, where stage 250 includes identifying multiple assignment groups and corresponding DLP policies, there is a possibility that some users or user devices belong to more than one assignment group with differing DLP policies. This issue can be solved in a variety of ways. In one example, the third-party server is instructed to apply the most restrictive DLP policy that can potentially apply to a user or a device. For example, if User 1 is in both the first and second assignment groups and the second DLP policy for the second assignment group is more restrictive, the third-party server can apply the second DLP policy to User 1. In other examples, the third-party server can utilize the least restrictive DLP policy applicable to the user.

At stage 255, the third-party server can communicate to the management server that the DLP policy or policies have been saved and assigned as instructed.

At stage 260, the administrator can publish the application a set of devices. The administrator can utilize the console to select one or more applications to publish. By publishing an application, the administrator can allow the management server to provision the application to user devices in later steps. Stage 260 can include selecting a set of devices that can download the published application. For example, the administrator can select devices based on user groups, assignment groups, or any other types of groupings that include users or user devices. If the administrator chooses the set of devices based on a group that specifies users, rather than user devices, the management server can access a database to cross reference the user devices assigned to those users and publish the application to those devices.

At stage 265, the management server can send a command to the user device, instructing the user device to check in and download the published application. The command can be sent to the management agent on the user device, in an example. In another example, the command instructs the device to display a notification that the user can select to download the application. The user device can contact the management server at stage 265 and download the application at stage 270. In examples where the administrator publishes multiple applications in a batch, stage 270 can include downloading all of those applications. Stage 270 can also include installing the application, or applications, on the user device.

At stage 275, the user device can contact the third-party server to retrieve any DLP policies relevant to the application and the device. Stage 275 can be performed as a result of an instruction provided by the administrator, management server, management agent, or the application itself. In some examples, the management server instructs the user device to both download the application and then check in with the third-party server for a DLP policy. In other examples, the application can include functionality that blocks features of the application (or prevents any use of the application) until the third-party server confirms that any required DLP policies are in place.

At stage 280, the DLP policy is pushed to the user device and applied. The DLP policy can be stored in a profile accessible to the application, management agent, or both. The application can access the DLP policy when it is opened, when it is executing, or both. In some examples, the application can check for DLP policy changes at predetermined time intervals. In other examples, the application can check for DLP policy changes when it receives a communication from the third-party server instructing the application to check in and download an updated DLP policy.

FIG. 3 provides an example illustration of a console interface 300 that an administrator can use to establish and implement DLP policies in accordance with the methods described above. The interface 300 can be provided at a console, such as a web page displayed on a computing device associated with the administrator. In the example of FIG. 3, the page being displayed relates to "DLP settings." Three sub-categories are available to the administrator: a data-loss-prevention page 305, an assigned-groups page 310, and an authentication page 315. FIG. 3 shows the data-loss-prevent page 305 being selected, while FIGS. 4 and 5 show the assigned-groups page 310 and authentication page 315 being selected, respectively.

A current setting selection 320 is provided, allowing an administrator to inherit selections for the data-loss-prevention page 305 selections or override them. This can be selected using buttons associated with the current selection setting 320, although other selection mechanisms can be used as well. The data-loss-prevention page 305 includes various selections displayed on the interface 300. These selections are exemplary and not representative of an exhaustive list of available options.

Option 325 allows an administrator to prevent backup of a file, document, or object associated with an application subject to the DLP policy. In the example of FIG. 3, the administrator has selected as "yes" button to prevent backup. In the right-hand column, the administrator can tailor the restriction to apply to particular operation systems. This example shows ANDROID selected, plus one more that is not shown. The additional operation system can be iOS, in an example. For any of the options 325-355 listed, the operation systems to which each option applies can be configured individually.

Option 330 allows DLP-applicable applications to transfer data to other applications, while option 335 allows DLP-applicable applications to receive data from other applications. In the example of FIG. 3, both options 330, 335 are set to "all," meaning that the applications can transfer and receive data to or from all other applications. However, the administrator can select "none" to prevent any transfer or receipt of data. The administrator can also select "restricted" to provide a restricted list of applications available to transfer to, or receive from, the DLP-applicable applications. In some examples, selecting the "restricted" button launches a graphical user interface element allowing the administrator to select or deselect particular applications.

Option 340 prevents a user from utilizing the "save as" function within a DLP-applicable application. This can prevent users from saving an application to their device and further modifying it without permission. In the example of FIG. 3, this option 340 is set to "yes," thereby preventing utilization of the "save as" function.

Option 345 can restrict cutting, copying, and/or pasting from or to other applications. This can prevent unauthorized copying of information within a restricted document. While this option 345 can include buttons, such as the "all," "restricted," or "none" buttons associated with options 330 and 335, in this example the option 345 is associated with a drop-down listing. The drop-down list allows an administrator to chose "any app" or to expand the list and select one or more individual applications.

Option 350 can restrict web content from displaying outside a managed browser. This option can increase security by ensuring that enterprise users only view web content in a secure manger. Selecting a "yes" button can implement the restriction, requiring the display of web content to be within a managed browser. A selection of the "no" button can forego the restriction.

Option 355 can provide a requirement for encrypting application data. This can cause an application to store all data on the device in an encrypted format rather than an unencrypted format. Option 355 can include a drop-down list allowing the administrator to choose between various selections for when an application should encrypt its data. The selections can include, for example, "never," "always," "when the device is locked," "when the device is idle," and "when logged in." In this example, option 355 is set to apply to iOS but not ANDROID.

To apply the selections from FIG. 3 to a group of users, the administrator can select the assigned-groups page 310. FIG. 4 provides an illustration of the user interface 300 after selecting the assigned-groups page 310. As with the data-loss-prevention page 305, the option 420 to inherit or override existing settings is still displayed in this example. Also displayed is a search bar 430 for searching the system for user groups. The search bar 430 can search a database associated with the management server for any groups matching the keywords provided in the search bar 430.

The results of the search can be displayed in a first location, such as the box directly under the search bar 430. The administrator can select one or more groups from the search results and select the "add group" button 440 to add those groups to a list. The list can be displayed in the box directly above the "remove group" button 450. After a group has been added to the list, the administrator can select the group and remove it by using the "remove group" button 450.

A child-permission selection 460 can allow an administrator to indicate whether the permissions for a child device should be inherited only, overridden only, or a combination of inherited and overridden. When the administrator has made this selection and finalized the groups added via the "add group" button 440, the administrator can select the "save & assign" button 470. This button 470 can merge all added groups into an assignment group and associate the selected DLP policies to that assignment group.

The administrator can then provide authentication credentials at the authentication page 315, shown in FIG. 5. After selecting the authentication page 315, the administrator can provide a user name in the user name field 530 and a password in the password field 540. The administrator can then save the credentials using the save button 550. The same child-permission selection 560 displayed on the assigned-groups page 310 can be displayed on the authentication page 315. A "save & assign" button 570 can also be displayed on the authentication page 315, allowing the administrator to finalize the settings and assign DLP policies to the relevant assignment group.

FIG. 6 provides an illustration of an example system for carrying out any of the methods described here. The system can include a management server 620. The management server 620 can be a single server or a network of servers and can utilize one or more processors and memory stores. It can also store information regarding users and user devices enrolled into the enterprise system, user profiles, compliance rules, and authorizations for particular users, devices, and applications. This information can be stored at the management server 620 or at a database 622 accessible to the management server 620. An enterprise administrator with adequate credentials can access information stored in, or accessible to, the management server. The administrator can access that information through a web portal or console 610 that is in communication with the management server 620. The console 610 can be a standalone computing device, or a GUI displayed on a computing device. For example, the console 610 can be a web portal. The management server 620 can also include an enrollment component 624 and an administrator component 626, both of which can be used for enrolling a user device 650 with the management server 620, as discussed with respect to stage 230 of FIG. 2.

The management server 620 can update and synchronize with an identity service 630. The identity service can store a directory 632 of users and user groups associated with the management server 620. In some examples, the identity service 630 can provide identity verification services, such as single-sign-on ("SSO") or other authentication-related services. However, in some examples the identity service 630 can simply provide a directory 632 that lists users and their accompanying user groups, user devices, user emails, and other information.

The directory 632 can include a listing of enrolled users and any relevant user groups. The directory can be continuously updated by the management server 620, either periodically or whenever a change is made at the management server 620. In one example, the identity service 630 is an ACTIVE DIRECTORY service.

The system of FIG. 6 can also include a third-party server 640. In addition to being accessible by the management server 620, the identity service 630 can also be accessible by the third-party server 640. In this example, the third-party server 640 is managed or operated by a third party that provides an application to be provisioned to a user device 650. The third-party server 640 can synchronize with the identity service 630. In some examples, the management server 620 alerts the third-party server 640 that a change has been made at the identity service 630. In other examples, the identity service 630 alerts the third-party server 640 when it detects a change in the directory 632. The third-party server 640 can synchronize with the directory 632 periodically or when it receives an indication that a change has taken place at the directory 632.

The third-party server 640 can keep a database 642 that reflect information from the directory 632 of the identity server 630. This can allow the third-party server 640 to periodically receive updates from the directory 632 and save them locally in the database 642 for easier, faster access during operation. The third-party server 640 can also store DLP policies 644 received from the management server 620. The DLP policies 644 can include assignment groups, DLP settings, and relevant applications, as explained previously.

The system of FIG. 6 can also include a user device 650 that receives the application 652 from the management server 620. The user device 650 can include a management agent 654. The management agent 654 can be a portion of an operating system for the device 650, or it can operate in the application layer of the device 650. For example, the management agent 654 can be a dedicated application or other software that can monitor and manage data, software components, and hardware components associated with the user device 650. The management agent 654 can monitor and control functionality and other managed applications on the user device 650. The management agent 654 installed on the user device 650 can include functionality for utilizing components specific to the user device 650, such as a GPS sensor, accelerometer, or gyroscope. The management agent can have privileged access to communicate with the management server 620.

The user device 650 can also store one or more DLP policies 656 relevant to the device 650. The DLP policies 656 stored at the device 650 can match the DLP policies 644 stored at the third-party server 640, in one example. The management agent 654 can enforce the DLP policies 656 at the device 650. In other examples, the application 652 can enforce the DLP policies 656 at the device 650. The third-party server 640 can instruct the application 652 to enforce the DLP policies 656 as instructed by the management server 620.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for deploying a data loss prevention (DLP) policy to a user device, comprising:
   displaying a graphical user interface (GUI) at an administrator device;
   receiving, through the GUI, a plurality of selections corresponding to a plurality of DLP options presented on the GUI and applicable to an application;
   receiving, through the GUI, a selection of an assignment group specifying a plurality of user devices to which the DLP policy should be applied;
   generating a configuration that specifies the DLP policy based on the selected options and selected assignment group;
   sending the configuration to the management server, wherein the management server:
   updates a record of the assignment group;
   synchronizes the record of the assignment group with an identity service; and
   causes a second server to implement the DLP policy for the plurality of user device in the assignment group; and
   causing a user device in the assignment group to retrieve the DLP policy from the second server and implement the DLP policy at the application.

2. The method of claim 1, further comprising causing the application to be provisioned to a user device.

3. The method of claim 1, wherein the identity service synchronizes with the second server.

4. The method of claim 1, wherein the user device retrieves the DLP policy from the second server based on the second server identifying the retrieving user device as being associated with the assignment group.

5. The method of claim 1, wherein the user device retrieves and implements the DLP policy without requiring input from the user regarding the DLP policy.

6. The method of claim 1, wherein the GUI provides a selectable icon for turning on or off each of the plurality of DLP options.

7. The method of claim 1, wherein the GUI provides a field for entering administrator credentials required to deploy the DLP policy.

8. A non-transitory, computer-readable medium comprising instructions that, when executed by a processor of an administrator device, perform stages for deploying a data loss prevention (DLP) policy to a user device, the stages comprising:
   displaying a graphical user interface (GUI) at the administrator device;
   receiving, through the GUI, a plurality of selections corresponding to a plurality of DLP options presented on the GUI and applicable to an application;
   receiving, through the GUI, a selection of an assignment group specifying a plurality of user devices to which the DLP policy should be applied;
   generating a configuration that specifies the DLP policy based on the selected options and selected assignment group;
   sending the configuration to the management server, wherein the management server:
   updates a record of the assignment group;
   synchronizes the record of the assignment group with an identity service; and
   causes a second server to implement the DLP policy for the plurality of user device in the assignment group; and
   causing a user device in the assignment group to retrieve the DLP policy from the second server and implement the DLP policy at the application.

9. The non-transitory, computer-readable medium of claim 8, the stages further comprising causing the application to be provisioned to a user device.

10. The non-transitory, computer-readable medium of claim 8, wherein the identity service synchronizes with the second server.

11. The non-transitory, computer-readable medium of claim 8, wherein the user device retrieves the DLP policy from the second server based on the second server identifying the retrieving user device as being associated with the assignment group.

12. The non-transitory, computer-readable medium of claim 8, wherein the user device retrieves and implements the DLP policy without requiring input from the user regarding the DLP policy.

13. The non-transitory, computer-readable medium of claim 8, wherein the GUI provides a selectable icon for turning on or off each of the plurality of DLP options.

14. The non-transitory, computer-readable medium of claim 8, wherein the GUI provides a field for entering administrator credentials required to deploy the DLP policy.

15. An administrator device for deploying a data loss prevention (DLP) policy to a user device, comprising:
   a processor; and
   a memory storage containing a non-transitory, computer-readable medium comprising instructions that, when executed by the processor, carry out stages comprising:
      displaying a graphical user interface (GUI) at the administrator device;
      receiving, through the GUI, a plurality of selections corresponding to a plurality of DLP options presented on the GUI and applicable to an application;
      receiving, through the GUI, a selection of an assignment group specifying a plurality of user devices to which the DLP policy should be applied;
      generating a configuration that specifies the DLP policy based on the selected options and selected assignment group;
      sending the configuration to the management server, wherein the management server:
         updates a record of the assignment group;
         synchronizes the record of the assignment group with an identity service; and
         causes a second server to implement the DLP policy for the plurality of user device in the assignment group; and
      causing a user device in the assignment group to retrieve the DLP policy from the second server and implement the DLP policy at the application.

16. The administrator device of claim 15, the stages further comprising causing the application to be provisioned to a user device.

17. The administrator device of claim 15, wherein the identity service synchronizes with the second server.

18. The administrator device of claim 15, wherein the user device retrieves and implements the DLP policy without requiring input from the user regarding the DLP policy.

19. The administrator device of claim 15, wherein the GUI provides a selectable icon for turning on or off each of the plurality of DLP options.

20. The administrator device of claim 15, wherein the GUI provides a field for entering administrator credentials required to deploy the DLP policy.

* * * * *